United States Patent [19]

Rosek

[11] Patent Number: 5,076,005
[45] Date of Patent: Dec. 31, 1991

[54] VERTICAL RETRIEVE SPINNER DEVICE

[76] Inventor: William A. Rosek, Rte. 4, Box 244, Waverly, Va. 23890

[21] Appl. No.: 607,394

[22] Filed: Oct. 31, 1990

[51] Int. Cl.[5] .............................................. A01K 85/00
[52] U.S. Cl. .................................... 43/42.14; 43/42.19
[58] Field of Search ............... 43/42.11, 42.12, 42.13, 43/42.14, 42.15, 42.16, 42.19, 42.17, 42.18

[56] References Cited

U.S. PATENT DOCUMENTS

| | | | |
|---|---|---|---|
| 2,610,429 | 9/1952 | Thomas | 43/42.17 |
| 2,886,913 | 5/1959 | Stanley | 43/42.19 |
| 2,926,451 | 3/1960 | Leba | 43/42.17 |
| 3,112,576 | 12/1963 | Tay | 43/42.14 |
| 3,533,182 | 10/1970 | Turbeville et al. | 43/42.14 |
| 3,750,325 | 8/1973 | Feltman | 43/42.19 |
| 3,766,682 | 10/1973 | Majdak | 43/42.14 |
| 4,135,323 | 1/1979 | Esten | 43/42.14 |
| 4,447,980 | 5/1984 | Bassett | 43/42.14 |
| 4,703,579 | 11/1987 | Kay | 43/42.19 |

Primary Examiner—Richard K. Seidel
Assistant Examiner—Chuck Y. Mah
Attorney, Agent, or Firm—Henderson & Sturm

[57] ABSTRACT

A vertical retrieve spinner device (10) for use with a variety of fishing lures (100) wherein the spinner device (10) has a multi-blade spinner member (19) that is designed to rotate when the device (10) is lowered and raised in a generally vertical plane in the water.

3 Claims, 1 Drawing Sheet

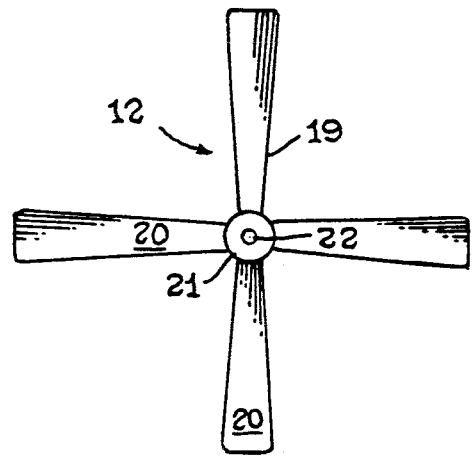
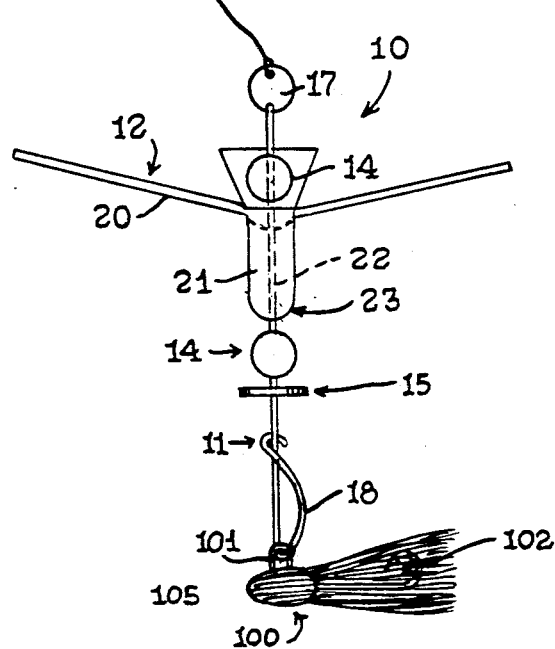
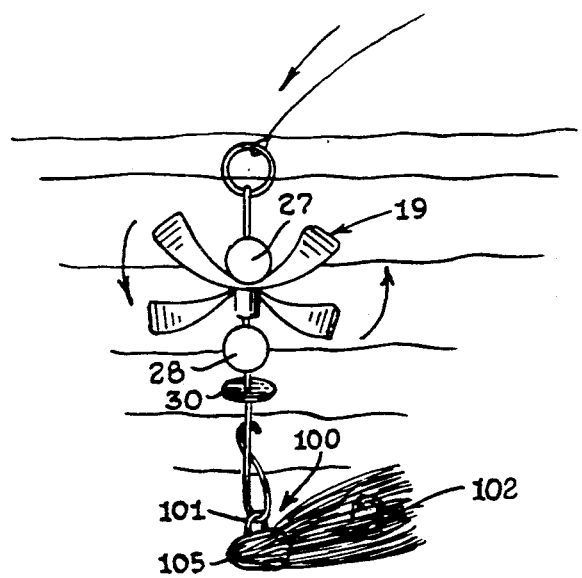
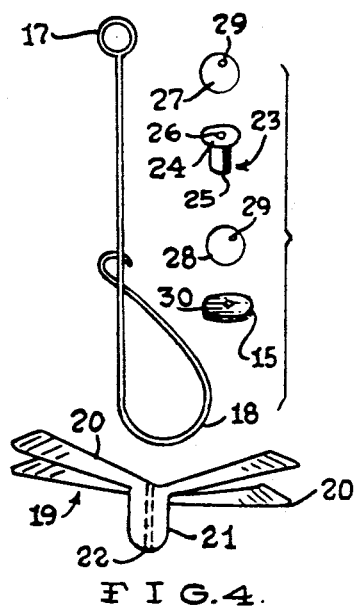

VERTICAL RETRIEVE SPINNER DEVICE

TECHNICAL FIELD

The present invention relates to the field of fishing lures in general, and in particular to a spinner blade arrangement that permits the spinner blade to rotate in virtually all orientations, but particularly in the vertical plane.

BACKGROUND ART

This invention was the subject matter of Document Disclosure Program Registration No. 247,459, which was filed in the U.S. Patent and Trademark Office on Mar. 12, 1990.

As can be seen by reference to the following U.S. Pat. Nos. 3,112,576; 3,533,180; 4,447,980; and 4,709,579; the prior art is replete with myriad and diverse spinner blade arrangements used to entice fish to strike at a fishing lure.

While all of the aforementioned prior art constructions are more than adequate for the basic purpose and function for which they have been specifically designed, these patented constructions have been uniformly deficient in their failure to recognize the fact that there are many instances wherein a fisherman desires to have the spinner blade rotating in a generally vertical plane, as opposed to the substantially horizontal plane that activates virtually all spinner blade constructions when the lure is being retrieved over open water.

Examples of situations when vertical plane rotations of the spinner blade would be desirable include, but are not limited to, ice fishing, jigging over brush piles and along drop-offs and ledges, as well as during the countdown method of fishing wherein the cast lure is allowed to sink for a predetermined period of time to reach a certain depth before the lure is retrieved in the normal manner along a generally horizontal plane.

As a consequence of the foregoing situation, there has existed a longstanding need among fishermen for a spinner arrangement that is specifically designed to produce rotation of the spinner element as the arrangement either sinks downwardly, or is retrieved upwardly in a generally vertical plane, while the attached lure body remains in a generally horizontal disposition, and the provision of such a construction is a stated objective of the present invention.

DISCLOSURE OF THE INVENTION

Briefly stated, the vertical retrieve spinner device that forms the basis of the present invention is designed for use with a wide variety of fishing lures in general; but, particularly for use with lead-headed jig bodies wherein the conventional wire attachment loop is disposed on the top of the jig head, as opposed to the front of the jig head.

The vertical retrieve spinner device comprises in general, a primary wire unit, a spinner blade unit, a plurality of auxiliary bearing units, and a stop unit.

As will be explained in greater detail further on in the specification, the structural components that comprise the spinner device are arranged in such a manner that they are particularly well suited to impart rotary movement to the spinner blade unit when the device is attached to a fishing lure and moved up and down in a generally vertical plane.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the vertical retrieve spinner device;

FIG. 2 is a top plan view of the spinner blade unit;

FIG. 3 is a perspective view of the spinner device in use; and

FIG. 4 is an exploded view of the device.

BEST MODE FOR CARRYING OUT THE INVENTION

As can be seen by reference to the drawings, and in particular to FIG. 1, the vertical retrieve spinner device that forms the basis of the present invention is designated generally by the reference numeral (10). The device (10) comprises a primary wire support unit (11), a spinner unit (12), a plurality of auxiliary bearing units (14), and a stop unit (15). These units will now be described in seriatim fashion.

As can best be seen by reference to FIGS. 1 and 3, the primary wire support unit (11) comprises an elongated strand of wire (16) having an eyelet member (17) formed on its upper end and a looped snap member (18) formed on its lower end.

Turning now to FIGS. 2 and 4, it can be seen that the spinner unit (12) comprises a generally rigid multi-blade spinner member (19) having a plurality of spinner blades (20) radially disposed around generally elongated and integrally formed bearing element (21) equipped with a central aperture (22) that is dimensioned to receive the elongated strand of wire (16) in a well recognized fashion.

As shown in FIG. 1, the bearing element (21) of the preferred embodiment is formed integrally with, and depends downwardly from the spinner member (19); wherein, the lower end (23) of the bearing element (21) is provided with a rounded bearing surface.

Referring now to FIG. 3, it can be seen that the auxiliary bearing units (14) comprise a pair of spherical bearing members (27, 28) having central apertures (29) formed therein which are likewise dimensioned to receive the elongated strand of wire (16). One of the spherical bearing members (27) is disposed above the spinner member (19) and the other spherical bearing member (28) is disposed below the lower end (23) of the bearing element (21).

As shown in FIGS. 1 and 3, the stop unit (15) comprises a generally flat circular disk shaped stop member (30) which is securely fastened to the periphery of the wire (16) at a location below the lower spherical bearing member (28), such that the spinner member (19) will be maintained in close proximity to the eyelet member (17) on the upper end of the elongated wire member (16).

As can best be seen by reference to FIGS. 1 and 3, the device (10) was designed particularly for use with a fishing lure (100) having an eyelet (101) attached to the lure head (105) such that when the head (105) is engaged with the looped snap member (18), the head (105) and associated hook (102) will be disposed in a generally horizontal plane.

It should further be appreciated that due to the rigid and splayed nature of the spinner blades (20), any movement of the device (10) through the water will impart a rotary movement to the spinner blades (20). Of more importance, however, is the fact that as the device (10) and the associated fishing lure (100) falls downwardly through the water, the spinner member (19) will be forced upwardly against the upper spherical bearing member (27) as it rotates, and as the device (10) is retrieved upwardly, the spinner member (19) will be forced downwardly until the bearing surface (23) contacts the other spherical bearing member (28) to continue to impart rotary movement to the spinner blades (20).

In this manner, the spinner blades (20) will be in virtually constant rotary movement, regardless of the orientation of the device (10) as it moves through the water.

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A vertical retrieve spinner device for use in a fishing lure assembly having an eyelet formed on the lure head wherein the device comprises:
   a primary wire support unit including an elongated strand of wire having an eyelet formed on the upper end and a looped snap member formed in the lower end;
   a spinner unit operatively associated with the said strand of wire and including a generally rigid multi-bladed spinner member having an integrally formed downwardly depending bearing element having a rounded bottom surface, a recessed top surface, and an elongated axial aperture dimensioned to receive a portion of the elongated strand of wire; and,
   a pair of spherical bearing members having centrally disposed apertures dimensioned to receive said elongated strand of wire; wherein, one of said spherical bearing members is disposed above the multi-bladed spinner member and dimensioned to be partially received in he top surface of he downwardly depending bearing element; and, wherein the other spherical bearing member id disposed below the rounded bottom surface of the downwardly depending bearing element.

2. The device as in claim 1 further comprising:
   a stop unit operatively associated with the wire support unit and disposed below the said spinner unit.

3. The device as in claim 2; wherein, said other spherical bearing member is disposed intermediate the bottom surface of the downwardly depending bearing element and the said stop unit.

* * * * *